United States Patent
Liu et al.

(10) Patent No.: US 7,415,546 B2
(45) Date of Patent: Aug. 19, 2008

(54) METHOD AND APPARATUS FOR INTERFACING A PERIPHERAL DEVICE CORRESPONDING TO THE DETECTION OF INTERFACE

(75) Inventors: Hsiang Sheng Liu, Zhubei (TW); Pak Man Ma, Zhubei (TW)

(73) Assignee: Holtek Semiconductor, Hsinchu (TW)

( * ) Notice: Subject to any disclaimer, the term of this patent is extended or adjusted under 35 U.S.C. 154(b) by 0 days.

(21) Appl. No.: 11/266,277

(22) Filed: Nov. 4, 2005

(65) Prior Publication Data
US 2007/0083692 A1 Apr. 12, 2007

(30) Foreign Application Priority Data
Oct. 6, 2005 (TW) .............................. 94134906 A

(51) Int. Cl.
*G06F 3/00* (2006.01)
(52) U.S. Cl. ........................................ 710/11; 709/237
(58) Field of Classification Search ................. 709/237; 710/8, 10–11, 304
See application file for complete search history.

(56) References Cited
U.S. PATENT DOCUMENTS

| | | | |
|---|---|---|---|
| 5,991,546 A * | 11/1999 | Chan et al. .................... 710/62 |
| 6,151,645 A * | 11/2000 | Young et al. ................... 710/63 |
| 6,442,734 B1 | 8/2002 | Hanson et al. .................. 716/4 |
| 6,460,094 B1 | 10/2002 | Hanson et al. .................. 710/8 |
| 6,625,790 B1 | 9/2003 | Casebolt et al. ................. 716/8 |
| 6,795,949 B2 | 9/2004 | Hanson et al. .................. 716/1 |
| 2005/0057295 A1 * | 3/2005 | Tsai et al. .................... 327/291 |
| 2005/0240704 A1 * | 10/2005 | Leaming ..................... 710/301 |
| 2007/0064778 A1 * | 3/2007 | Lacy et al. .................... 375/219 |

* cited by examiner

*Primary Examiner*—Clifford H Knoll
(74) *Attorney, Agent, or Firm*—Troxell Law Office, PLLC

(57) ABSTRACT

The invention relates to an apparatus for interfacing a peripheral device corresponding to the detection of interface, which comprises: a regulator, for regulating the working voltage of the circuit of the apparatus; an USB physical layer with switch controller, for detecting and determining whether the interface to which the peripheral device is connected is an USB interface and thus being capable of enabling an USB mode of the apparatus; at least four pull-high switch resistors; and an analog switch, capable issuing an analog signal while the apparatus is in the USB mode; wherein the PS2 mode of the apparatus is enabled while the USB physical layer with switch controller detects no USB interface being connected to the peripheral device, and the mode of the apparatus is controlled by the interaction of the on/off statuses of the four pull-high switch resistors.

4 Claims, 4 Drawing Sheets

METHOD AND APPARATUS FOR INTERFACING A PERIPHERAL DEVICE CORRESPONDING TO THE DETECTION OF INTERFACE

FIELD OF THE INVENTION

The present invention relates to a method and apparatus for interfacing a peripheral device corresponding to the detection of interface, and more particularly, to a micro controller unit (MCU) arranged inside a peripheral device, which is capable of determining the type of interface to which the peripheral device is connected with respect to the signal generated from the connected interface, and thus enabling the peripheral to adopt a communication protocol corresponding to the type of the connected interface for signal transmission.

BACKGROUND OF THE INVENTION

On a conventional personal computer, a number of different interfaces are typically provided to enable data transfer and communication between the computer and external peripheral devices, such as a printer, a scanner, a keyboard, a pointing device (e.g., a mouse or trackball), a modem, etc. The typical personal computer includes a keyboard port (DIN or PS/2 style), two serial (RS-232) ports, a parallel port, a game port, and perhaps a PS/2 port for connecting a mouse or other pointing device. Recently, in order to improve the data transfer speed between peripheral devices and the computer interface, the USB interface has been developed and will soon be available on new computers.

As is always the case when any new technology becomes available that improves on what was previously available, an user who purchases a new computer including a USB port may want to use existing peripheral devices previously used with an older non-USB computer with the new computer, or vice versa, an user who purchases a new USB-enabled peripheral device might find it is difficult to couple the same on his old computer without USB interface.

It is noted that a conventional peripheral device is typically capable of supplying only one interface (such as a PS2 or USB interface) for communication with computers to which it is connected. Therefore, if the computer is provided with a PS2 interface, the keyboard or mouse must be configured to support communication with the computer according to a protocol defined by the PS2 interface. Similarly, if the computer is provided with the USB interface, the keyboard or mouse must be configured to communicate according to a protocol defined by the USB interface. Even when an older peripheral device is connected to a new computer by a built-in multi-purpose converter, it is usually that the older peripheral device interface still can not communication with the computer smoothly since it do not have the ability of dynamically detecting the type of interface to which the older peripheral device is connected and then converting signals accordingly.

It is known that most of the computers available today are equipped with both PS2 interface and USB interface, or one of the two, and since both PS2 and USB interfaces use four signal lines for transmitting signals and providing power, it is desire to have an apparatus capable of dynamically detecting the type of interface to which it is connected so as to enable a peripheral device comprising the apparatus to communicate with a computer either through an USB interface or a PS2interface, i.e. enable the peripheral device to communicate with the connected computer using USB protocol as it is connected thereto through an USB interface, or enable the peripheral device to communicate with the connected computer using PS2 protocol as it is connected thereto through a PS2 interface.

SUMMARY OF THE INVENTION

In view of the disadvantages of prior art, the primary object of the present invention is to provide a method and apparatus for interfacing a peripheral device corresponding to the detection of interface, which can be a micro controller unit (MCU) or a micro processor unit (MPU) embedded inside the peripheral device, capable of detecting the type of interface to which the peripheral device is connected according to the signal generated by the interface and then performing a signal conversion according to the communication protocol used by the interface.

To achieve the above object, the present invention provide an apparatus for interfacing a peripheral device corresponding to the detection of interface, comprising:
a regulator, for regulating the working voltage of the circuit of the apparatus;
an USB physical layer with switch controller, for detecting and determining whether the interface to which the peripheral device is connected is an USB interface and thus capable of enabling an USB mode of the apparatus accordingly for transmission;
at least four pull-high switch resistors; and
an analog switch, capable issuing an analog signal while the apparatus is in the USB mode;
wherein a PS2 mode of the apparatus is enabled while the USB physical layer with switch controller detects no USB interface being connected to the peripheral device, and the mode of the apparatus is controlled by the interaction of the on/off statuses of the four pull-high switch resistors.

In addition, the present invention further provide a method for interfacing a peripheral device corresponding to the detection of interface, being adopted by an apparatus activated by a firmware arranged inside the peripheral device connecting to a computer, that the apparatus comprises a regulator, an USB physical layer with switch controller, an analog switch, a first pull-high switch resistor, a second pull-high switch resistor, a third pull-high switch resistor, and a fourth pull-high switch resistor, the method comprising the steps of:

(a) turning on the third and the fourth switch resistors, that can prevent the second data signal line from floating;

(b) turning on the analog switch and setting the default mode of the apparatus to be an USB mode;

(c) clearing a counter defining a specific time interval;

(d) entering an idle mode while setting up the firmware for making an evaluation to determine whether a complete USB token had been received;

(e) ensuring the USB mode is enabled while keeping the analog switch to stay on and turning off the first, the second, the third, and the fourth pull-high switch resistors;

(f) using the firmware to determine whether a complete PS2 command had been received;

(g) ensuring the PS2 mode is enabled while turning off the analog switch, the third, and the fourth pull-high switch resistors and turning on the first and the second pull-high switch resistors;

(h) using the firmware to determine whether the specific time interval had been reached;

(i) switching to PS2 mode by the firmware and issuing a PS2 code while clearing the counter; and (j) making an evaluation to determine whether the issued PS2 code is responded correctly by the computer; if so, the flow proceeds to step (g); otherwise, the flow proceeds to step (d).

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

It is known that the PS2 and USB interfaces have different hardware and software requirements, which must be met by the MCU in the peripheral device so that the peripheral device can communicate with the host computer.

The PS2 interface uses two conductors which include a separate clock conductor and a separate data conductor. These conductors are driven by the computer through an open-collector or open-drain circuit, and have a pull-high resistor (typically in the range of 2 k ohms to 10 k ohms) pulling the conductor to a rail voltage, which is 5V, inside the host computer. Another pull-high resistor is required inside the peripheral device as well. The peripheral device communicating over a PS2 interface is responsible for providing a clock signal on the clock conductor, regardless of the direction of data flow on the data conductor. The host computer pulls the clock conductor to a logic low level to inhibit communication from the peripheral device, and it can also pull the data conductor low to signal to the peripheral device that the host computer intends to transmit data to the peripheral device.

The USB interface also uses two conductors which include differential data signal conductors D+ and D−. In the USB interface at the USB port (i.e., at the host computer or USB hub), the two conductors are pulled to a logic low level via pull-high resistors. In the peripheral device, the D+ conductor is pulled to approximately 3.3 volts via a pull-high resistor if the peripheral device is a high-speed USB peripheral device. The D− conductor is pulled to 3.3 volts via a pull-high resistor if the peripheral device is a low-speed USB peripheral device. When a peripheral device is attached to the USB port, the USB host determines whether it is a low-speed or high-speed device by determining which of the D+ or D− conductors is pulled to the logical high level.

Figure 1:
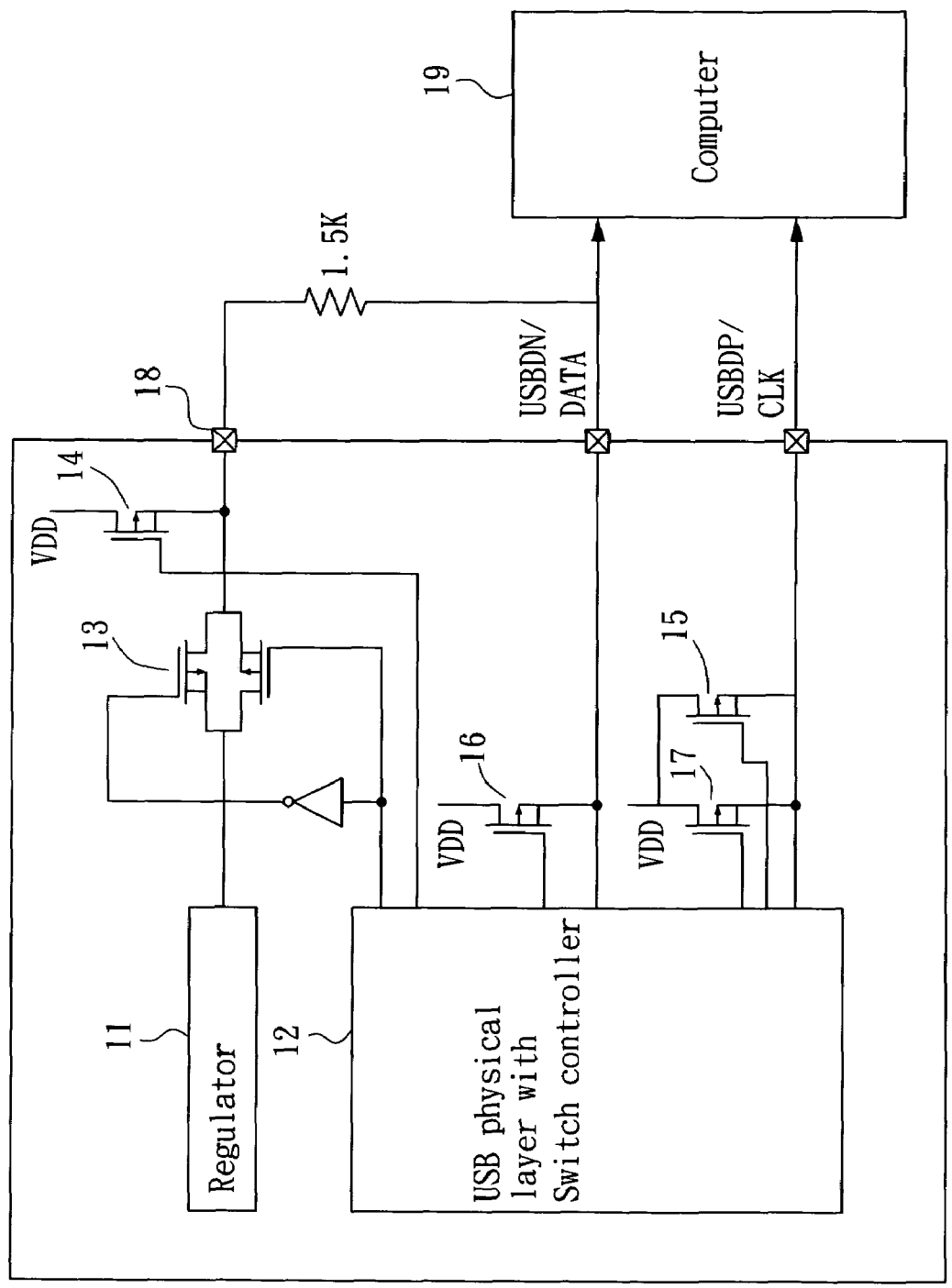
FIG. 1 is the architecture of an apparatus for interfacing a peripheral device corresponding to the detection of interface according to the present invention.

Please refer to FIG. 1, which is the architecture of an apparatus for interfacing a peripheral device corresponding to the detection of interface according to the present invention. The apparatus of the invention comprises:

a regulator 11, being connected to a voltage output unit 18, for regulating the working voltage of the circuit of the apparatus;

an USB physical layer with switch controller 12, for detecting and determining whether the interface to which the peripheral device is connected is an USB interface and thus capable of enabling an USB mode of the apparatus accordingly for transmission;

at least four pull-high switch resistors 14, 15, 16, 17; and an analog switch 13, capable issuing an analog signal while the apparatus is in the USB mode;

wherein a PS2 mode of the apparatus is enabled by using the regulator 11 to control the voltage output unit 18 to set the working voltage for 5V while the apparatus is connected to a PS2 interface, and an USB mode of the apparatus is enabled by using the regulator 11 to control the voltage output unit 18 to set the working voltage for 3.3V while the apparatus is connected to an USB interface, and the PS2 mode of the apparatus is enabled while the USB physical layer with switch controller 12 detects no USB interface being connected to the peripheral device, and the mode of the apparatus is controlled by the interaction of the on/off statuses of the four pull-high switch resistors 14, 15, 16, 17.

Figure 2:
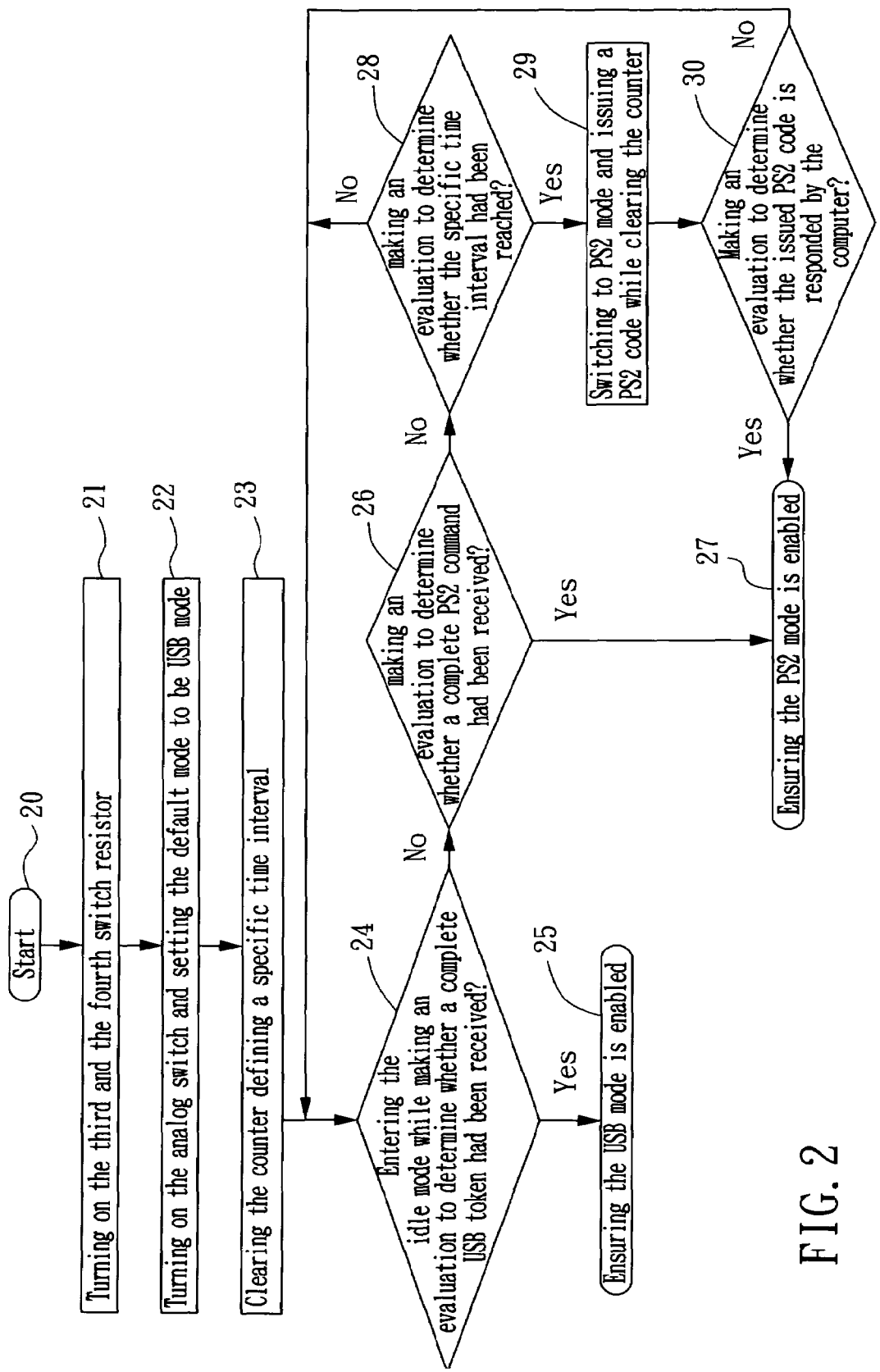
FIG. 2 is a flow chart depicting a method for interfacing a peripheral device corresponding to the detection of interface according to the present invention.

Please refer to FIG. 2, which is a flow chart depicting a method for interfacing a peripheral device corresponding to the detection of interface according to the present invention. As seen in FIG. 2, the present invention further provide a method for interfacing a peripheral device corresponding to the detection of interface, being adopted by an apparatus activated by a firmware arranged inside the peripheral device connecting to a computer, i.e. the flow start at step 20 where the firmware is activated, that the apparatus comprises a regulator 11, an USB physical layer with switch controller 12, an analog switch 13, a first pull-high switch resistor 14, a second pull-high switch resistor 15, a third pull-high switch resistor 16, and a fourth pull-high switch resistor 17, the method comprising the steps of:

step 21: turning on the third and the fourth switch resistors 16, 17, that can prevent the second data signal line from floating;

step 22: turning on the analog switch and setting the default mode of the apparatus to be an USB mode;

step 23: clearing a counter defining a specific time interval;

step 24: entering an idle mode while setting up the firmware for making an evaluation to determine whether a complete USB token had been received; if so, the flow proceeds to step 25; otherwise, the flow proceeds to step 26;

step 25: ensuring the USB mode is enabled while keeping the analog switch 13 to stay on and turning off the first, the second, the third, and the fourth pull-high switch resistors 14, 15, 16, 17;

step 26: using the firmware to determine whether a complete PS2 command had been received; if so, the flow proceeds to step 27; otherwise, the flow proceeds to step 28;

step 27: ensuring the PS2 mode is enabled while turning off the analog switch 13, the third, and the fourth pull-high switch resistors 16, 17 and turning on the first and the second pull-high switch resistors 14, 15;

step 28: using the firmware to determine whether the specific time interval had been reached; if so, the flow proceeds to step 29; otherwise, the flow proceeds to step 24;

step 29: switching to PS2 mode by the firmware and issuing a PS2 code while clearing the counter; and step 30: making an evaluation to determine whether the issued PS2 code is responded correctly by the computer; if so, the flow proceeds to step 27; otherwise, the flow proceeds to step 24.

Figure 3:
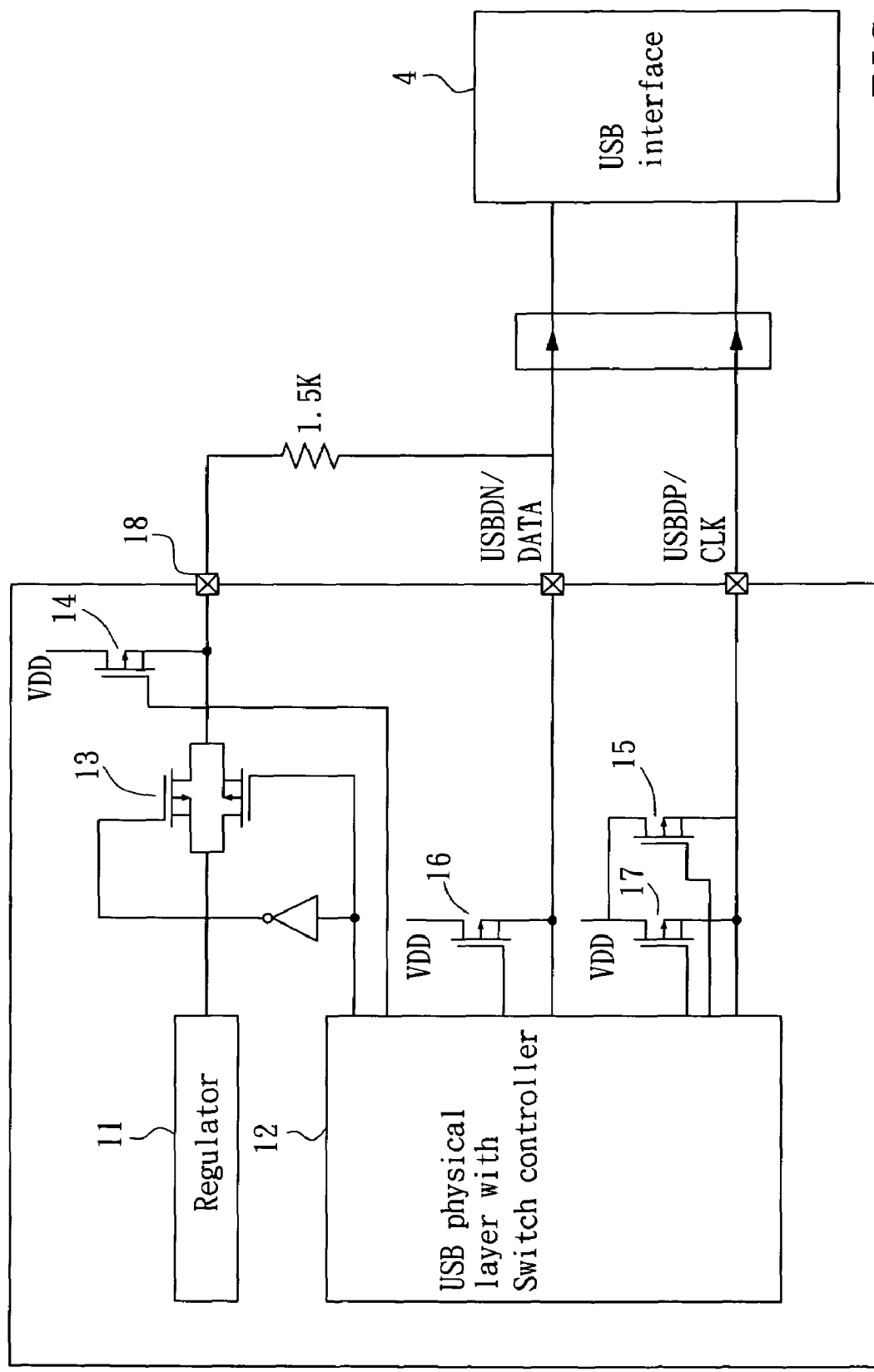
FIG. 3 is a schematic view showing an apparatus for interfacing a peripheral device corresponding to the detection of interface of the present invention is being connected to an USB interface of a computer.

Please refer to FIG. 3, which is a schematic view showing an apparatus for interfacing a peripheral device corresponding to the detection of interface of the present invention is being connected to an USB interface of a computer. When the apparatus of the invention is being connected to an USB interface, as soon as the USB interface is detected and ensured and then according to the steps shown in the aforesaid flowchart of FIG. 2, the analog switch is being turned on while the regulator will control the voltage output unit to set the working voltage for 3.3V.

Figure 4:
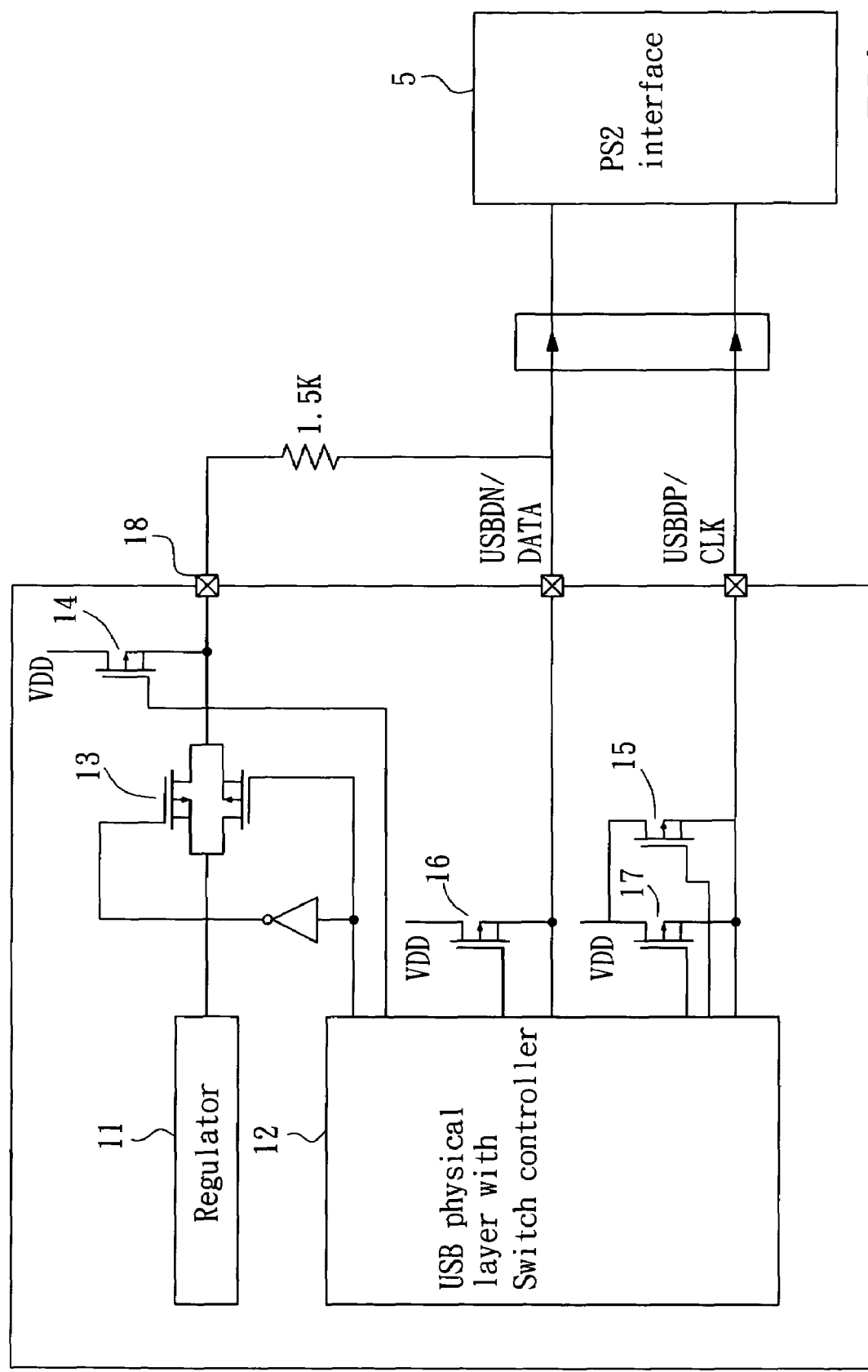
FIG. 4 is a schematic view showing an apparatus for interfacing a peripheral device corresponding to the detection of interface of the present invention is being connected to a PS2 interface of a computer.

Please refer to FIG. 4, which is a schematic view showing an apparatus for interfacing a peripheral device corresponding to the detection of interface of the present invention is being connected to a PS2 interface of a computer. When the apparatus of the invention is being connected to a PS2 interface, as soon as the PS2 interface is detected and ensured and then according to the steps shown in the aforesaid flowchart of FIG. 2, the analog switch, the third pull-high and the fourth switch resistors are being turned off and the first and the second switch resistors are being turned on while the regulator will control the voltage output unit to set the working voltage for 5V.

As disclosed in FIG. 1 to FIG. 4, the present invention can provide a method and apparatus for interfacing a peripheral device corresponding to the detection of interface, which can be a micro controller unit (MCU) or a micro processor unit (MPU) embedded inside the peripheral device, capable of detecting the type of interface to which the peripheral device is connected according to the signal generated by the interface and then performing a signal conversion according to the communication protocol used by the interface. That is, the apparatus of the invention is capable of dynamically detecting the type of interface to which it is connected so as to enable a peripheral device comprising the apparatus to communicate with a computer either through an USB interface or a PS2 interface, i.e. enable the peripheral device to communicate with the connected computer using USB protocol as it is connected thereto through an USB interface, or enable the peripheral device to communicate with the connected computer using PS2 protocol as it is connected thereto through a PS2 interface.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for interfacing a peripheral device corresponding to the detection of interface, being adopted by an apparatus activated by a firmware arranged inside the peripheral device connecting to a computer, the apparatus comprising a regulator, an USB physical layer with switch controller, an analog switch, a first pull-high switch resistor, a second pull-high switch resistor, a third pull-high switch resistor, and a fourth pull-high switch resistor, the method comprising the steps of:

(a) turning on the third and the fourth switch resistors, that can prevent the second data signal line from floating;
(b) turning on the analog switch and setting the default mode of the apparatus to be an USB mode;
(c) clearing a counter defining a specific time interval;
(d) entering an idle mode while setting up the firmware for making an evaluation to determine whether a complete USB token had been received;
(e) ensuring the USB mode is enabled while keeping the analog switch to stay on and turning off the first, the second, the third, and the fourth pull-high switch resistors;
(f) using the firmware to determine whether a complete PS2 command had been received;
(g) ensuring the PS2 mode is enabled while turning off the analog switch, the third, and the fourth pull-high switch resistors and turning on the first and the second pull-high switch resistors;
(h) using the firmware to determine whether the specific time interval had been reached;
(i) switching to PS2 mode by the firmware and issuing a PS2 code while clearing the counter; and
(j) making an evaluation to determine whether the issued PS2 code is responded to correctly by the computer; if so, the flow proceeds to step (g); otherwise, the flow proceeds to step (d).

2. The apparatus of claim 1, wherein the proceeding steps of the method jump from step (d) to step (e) while the evaluation of step (d) is positive; otherwise, the method proceeds to step (f) from step (d).

3. The apparatus of claim 1, wherein the proceeding steps of the method jump from step (f) to step (h) while the evaluation of step (f) is negative; otherwise, the method proceeds to step (f) from step (g).

4. The apparatus of claim 1, wherein the proceeding steps of the method jump from step (h) to step (d) while the evaluation of step (h) is negative; otherwise, the method proceeds to step (h) from step (i).

* * * * *